No. 688,487. Patented Dec. 10, 1901.
J. A. ROBERSON.
INSECT DESTROYER.
(Application filed June 28, 1901.)
(No Model.)
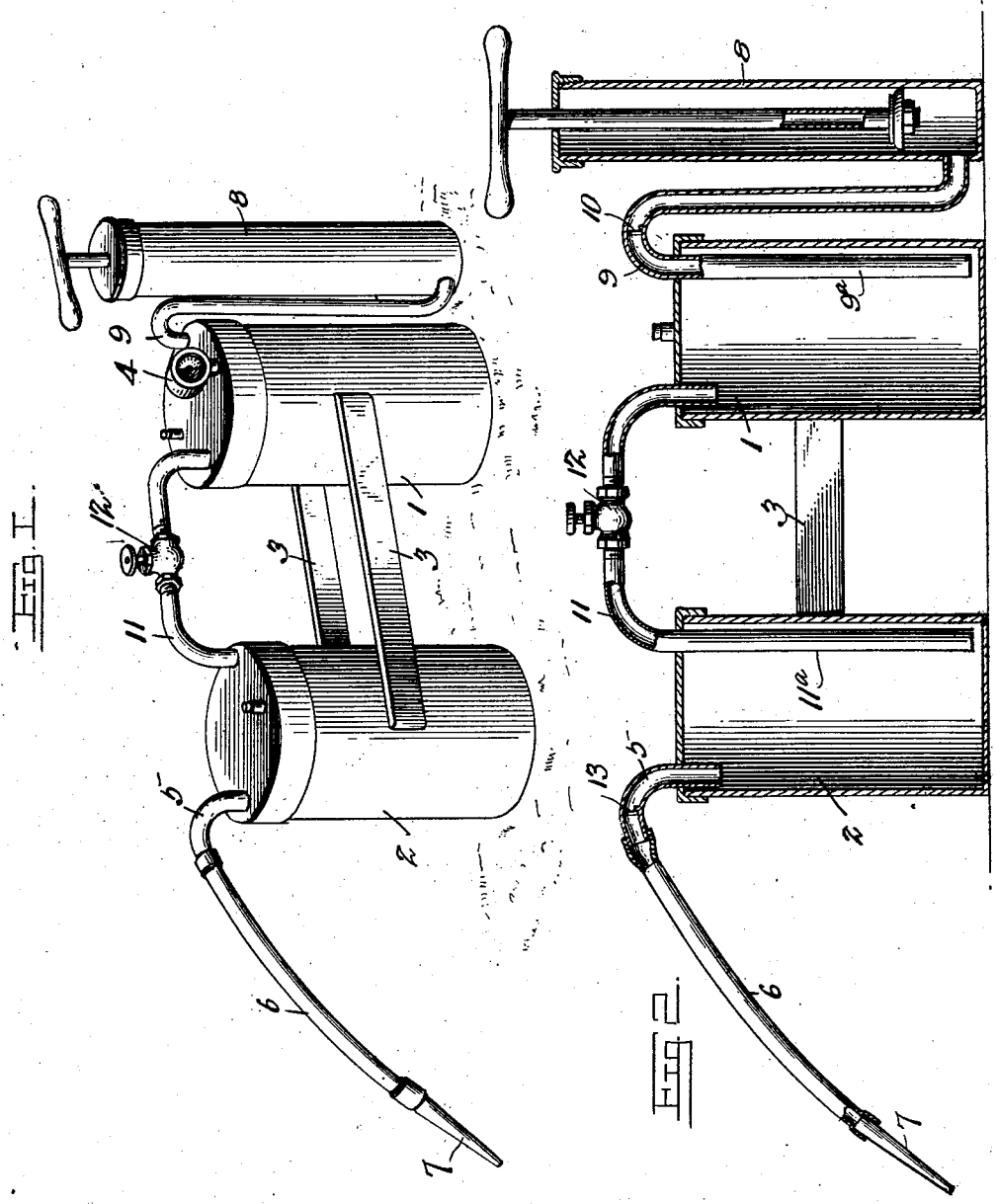
Witnesses
J. A. Roberson, Inventor
by C. A. Snow & Co.
Attorneys

UNITED STATES PATENT OFFICE.

JOHN A. ROBERSON, OF ARDMORE, INDIAN TERRITORY.

INSECT-DESTROYER.

SPECIFICATION forming part of Letters Patent No. 688,487, dated December 10, 1901.

Application filed June 28, 1901. Serial No. 66,420. (No model.)

*To all whom it may concern:*

Be it known that I, JOHN A. ROBERSON, a citizen of the United States, residing at Ardmore, Chickasaw Nation, Indian Territory, have invented a new and useful Insect-Destroyer, of which the following is a specification.

This invention relates to insect-destroyers, and has for its object to provide an improved spraying device for spraying a poison upon insects and to have the poison under pressure which is under the control of the operator for regulating the operation of the device. It is furthermore designed to assemble the parts in compact form and to arrange the same for convenience in carrying the device from place to place.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made, within the scope of the claims, without departing from the spirit or sacrificing any of the advantages of the invention.

In the drawings, Figure 1 is a perspective view of an insect-destroyer constructed and arranged in accordance with the present invention. Fig. 2 is a central longitudinal sectional view thereof.

Like characters of reference designate corresponding parts in both figures of the drawings.

In carrying out the present invention there are provided two tanks 1 and 2, which are connected by opposite cross-bars 3. The tank 1, from the function it performs, will hereinafter be designated the "pressure-tank" and the tank 2 the "mixing-tank." In the top of each tank there is provided a normally closed filling-opening, and the tank 1 is also provided with a pressure-gage 4. A tubular elbow 5 pierces the top of the tank 2 and has a flexible tube or pipe 6 connected to the outer end thereof, there being a sprayer-nozzle 7 carried at the outer free end of the pipe. At the opposite end of the device there is provided an air-pump 8, which is connected to the adjacent tank 1 by means of an inverted substantially U-shaped pipe 9, one branch 9ª of which pierces the top of the tank and dips down adjacent to the bottom thereof. In the upper bend of the pipe there is provided a check-valve 10.

Certain chemicals which give off a poisonous gas are placed within the tanks, and the latter are connected, so as to convey the gas from one to the other, by means of an inverted substantially U-shaped pipe 11, one branch of which pierces the top of the tank 1 and terminates adjacent to said top, while the other and longer branch 11ª pierces the top of the other tank and dips down close to the bottom thereof, the intermediate portion of the pipe being provided with a controlling-valve 12. It will be here observed that pipe 11, which connects the tanks and arches over the same, forms a handle for convenience in carrying the device.

In the elbow 5 there is provided a check-valve 13 to permit of the outward flow of gas.

By projecting the branches 9ª and 11ª, respectively, of the pipes 9 and 11 close to the bottoms of the respective tanks the air from the pump is caused to pass through the chemicals contained therein, and thus become thoroughly charged with the gases evolved therefrom, presenting thereby a thoroughly effective insecticide for the purpose stated.

In the operation of the device the pump is manipulated to obtain a predetermined pressure within the tank 1, which pressure is indicated by the gage 4, after which the pump is stopped. The discharge of gas is controlled by means of the valve 12 in the handle portion of the pipe 11, and the direction of the discharge is governed by means of the flexible pipe and nozzle.

The present device is especially designed for destroying ants by the application thereto of a poisonous gas, which is given off from chemicals placed in the tanks, and two tanks are employed, so as to pass the gas generated in one tank through the gas in the other tank, and thereby enrich the same to the desired degree for killing the insects.

What is claimed is—

1. An apparatus of the character specified, comprising a pressure-tank, a mixing-tank, and an air-pump, a pipe connecting the air-pump and the pressure-tank and having one of its branches projected to within a short distance of the bottom of the said tank, a second pipe connecting the two tanks and having one branch terminating near the top of the pressure-tank and the other branch projected to within a short distance of the bottom of the mixing-tank, and a distributing-pipe connected with the top of the latter tank.

2. An apparatus of the character specified, comprising a pressure-tank, a mixing-tank, and an air-pump, the two tanks being rigidly assembled, a pipe, including a check-valve connecting the air-pump and the pressure-tank and having one of its branches projected to within a short distance of the bottom of the said tank, a second pipe, including a cut-off valve, connecting the two tanks and having one branch terminating near the top of the pressure-tank and the other branch projected to within a short distance of the bottom of the mixing-tank, and a distributing-pipe, including a check-valve, connected with the top of the latter tank.

In testimony that I claim the foregoing as my own I have hereto affixed my signature in the presence of two witnesses.

JOHN A. ROBERSON.

Witnesses:
CHAS. H. COOK,
E. W. ROBERTS.